US012602951B2

(12) United States Patent
Arankalle et al.

(10) Patent No.: US 12,602,951 B2
(45) Date of Patent: Apr. 14, 2026

(54) APPLIANCE HAVING A CUSTOMIZABLE USER PROFILE

(71) Applicant: WHIRLPOOL CORPORATION, Benton Harbor, MI (US)

(72) Inventors: Mayuresh Prashant Arankalle, Pune (IN); Gregory A. Ferro, Elkhart, IN (US); Ameya S. Kshirsagar, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 53 days.

(21) Appl. No.: 18/756,594

(22) Filed: Jun. 27, 2024

(65) Prior Publication Data

US 2024/0346846 A1      Oct. 17, 2024

Related U.S. Application Data

(60) Continuation of application No. 18/072,989, filed on Dec. 1, 2022, now Pat. No. 12,033,430, which is a division of application No. 16/657,320, filed on Oct. 18, 2019, now Pat. No. 11,544,963.

(51) Int. Cl.
| | |
|---|---|
| *G06V 40/16* | (2022.01) |
| *G06F 16/23* | (2019.01) |
| *G06Q 20/08* | (2012.01) |
| *G06Q 20/10* | (2012.01) |
| *G06Q 20/38* | (2012.01) |
| *G10L 15/22* | (2006.01) |

(52) U.S. Cl.
CPC ........ *G06V 40/172* (2022.01); *G06F 16/2379* (2019.01); *G06Q 20/0855* (2013.01); *G06Q 20/102* (2013.01); *G06Q 20/3821* (2013.01);

*G06V 40/161* (2022.01); *G10L 15/22* (2013.01); *G10L 2015/223* (2013.01)

(58) Field of Classification Search
CPC ..................................................... G06V 40/172
See application file for complete search history.

(56) References Cited

U.S. PATENT DOCUMENTS

| | | |
|---|---|---|
| 6,315,197 B1 | 11/2001 | Beardsley |
| 7,277,967 B2 | 10/2007 | Kao et al. |
| 9,009,068 B2 | 4/2015 | Viviano et al. |
| 9,953,151 B2 | 4/2018 | Leow |
| 10,019,724 B2 | 7/2018 | Patel |
| 10,152,756 B2 | 12/2018 | Isaacson et al. |
| 2009/0006970 A1 | 1/2009 | Jeffery et al. |
| 2015/0000026 A1 | 1/2015 | Clements |
| 2017/0255942 A1 | 9/2017 | Chandrasekaran et al. |
| 2018/0225886 A1 | 8/2018 | Carrara et al. |
| 2018/0305856 A1 | 10/2018 | Welch |
| 2019/0102770 A1 | 4/2019 | Kim et al. |

FOREIGN PATENT DOCUMENTS

| | | |
|---|---|---|
| CN | 206591305 U | 10/2017 |
| WO | 2008030232 A1 | 3/2008 |

*Primary Examiner* — Jason Y Ko
(74) *Attorney, Agent, or Firm* — Price Heneveld LLP

(57) ABSTRACT

An appliance includes a body, an interface panel, a scanning device, and a controller. The interface panel is coupled to the body. The scanning device is coupled to the interface panel and is configured to conduct a facial scan and gather a facial data set. The controller is communicatively coupled to the scanning device, wherein the controller is configured to receive the facial data set and compare the facial data set to a stored verification data set. The controller is configured to activate a routine based on the comparison of the facial data set and the stored verification data set.

20 Claims, 8 Drawing Sheets

Method 400 of operating an appliance

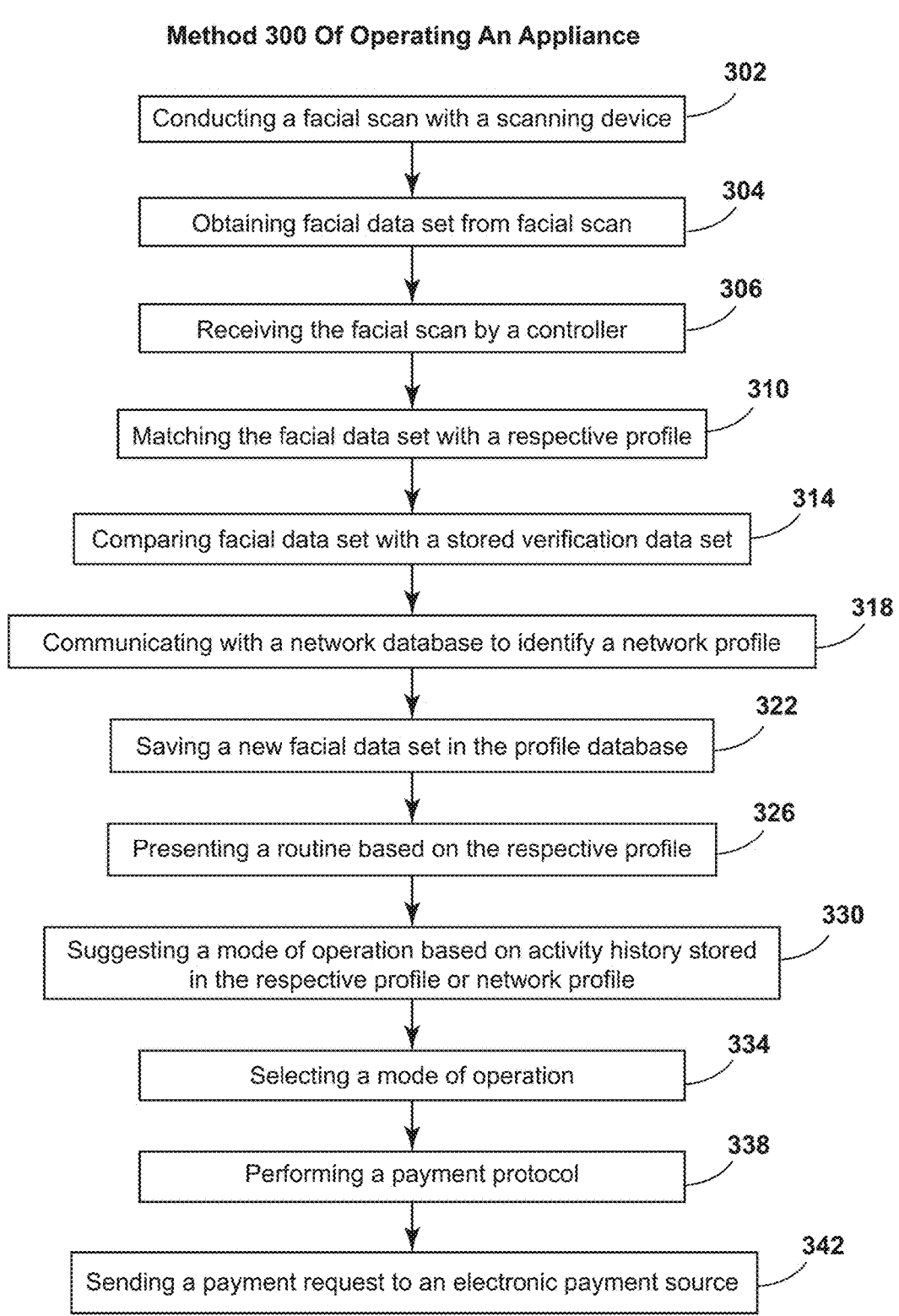

Method 300 Of Operating An Appliance

Conducting a facial scan with a scanning device — 302

Obtaining facial data set from facial scan — 304

Receiving the facial scan by a controller — 306

Matching the facial data set with a respective profile — 310

Comparing facial data set with a stored verification data set — 314

Communicating with a network database to identify a network profile — 318

Saving a new facial data set in the profile database — 322

Presenting a routine based on the respective profile — 326

Suggesting a mode of operation based on activity history stored in the respective profile or network profile — 330

Selecting a mode of operation — 334

Performing a payment protocol — 338

Sending a payment request to an electronic payment source — 342

FIG. 9

APPLIANCE HAVING A CUSTOMIZABLE USER PROFILE

CROSS-REFERENCE TO RELATED APPLICATIONS

The present application is a continuation of U.S. patent application Ser. No. 18/072,989, filed Dec. 1, 2022, now U.S. Pat. No. 12,033,430, entitled "AN APPLIANCE HAV-ING A CUSTOMIZABLE USER PROFILE", which is a divisional of U.S. Ser. No. 16/657,320, filed on Oct. 18, 2019, now U.S. Pat. No. 11,544,963, entitled "AN APPLI-ANCE HAVING A CUSTOMIZABLE USER PROFILE," the disclosures to which are hereby incorporated herein by reference in their entireties.

BACKGROUND OF THE DISCLOSURE

The present disclosure generally relates to an appliance, and more specifically, an appliance having a user interface that can be customized to a particular user.

SUMMARY OF THE DISCLOSURE

According to one aspect of the present disclosure, an appliance comprises a body, an interface panel, a scanning device, a controller, and a memory storage. The interface panel is coupled to the body. The scanning device is coupled to the interface panel and is configured to conduct a facial scan for gathering a facial data set. The controller is operably coupled to the scanning device, wherein the controller is configured to receive the facial data set. The memory storage is operably coupled to the controller, wherein the memory storage includes a profile database that includes a stored verification data set. The controller is configured to use the facial data set from the scanning device to compare the facial data set and the stored verification data set. The controller is further configured to activate a routine based on a respective profile from the profile database when the facial data set matches the stored verification data set.

According to another aspect of the present disclosure, an appliance includes a body, an interface panel, a scanning device, and a controller. The interface panel is coupled to the body. The scanning device is coupled to the interface panel and is configured to conduct a facial scan and gather a facial data set. The controller is communicatively coupled to the scanning device, wherein the controller is configured to receive the facial data set and compare the facial data set to a stored verification data set. The controller is configured to activate a routine based on the comparison of the facial data set and the stored verification data set.

According to yet another aspect of the present disclosure, a method of operating an appliance includes conducting a facial scan with a scanning device, obtaining a facial data set from the facial scan, transferring the facial data set to a controller, matching the facial data set with a respective profile within a profile database, and presenting a routine based on the respective profile.

These and other features, advantages, and objects of the present disclosure will be further understood and appreci-ated by those skilled in the art by reference to the following specification, claims, and appended drawings.

BRIEF DESCRIPTION OF THE DRAWINGS

In the drawings:

FIG. 9 is a flow diagram for a method of operating an appliance of the present disclosure.

Figure 1:
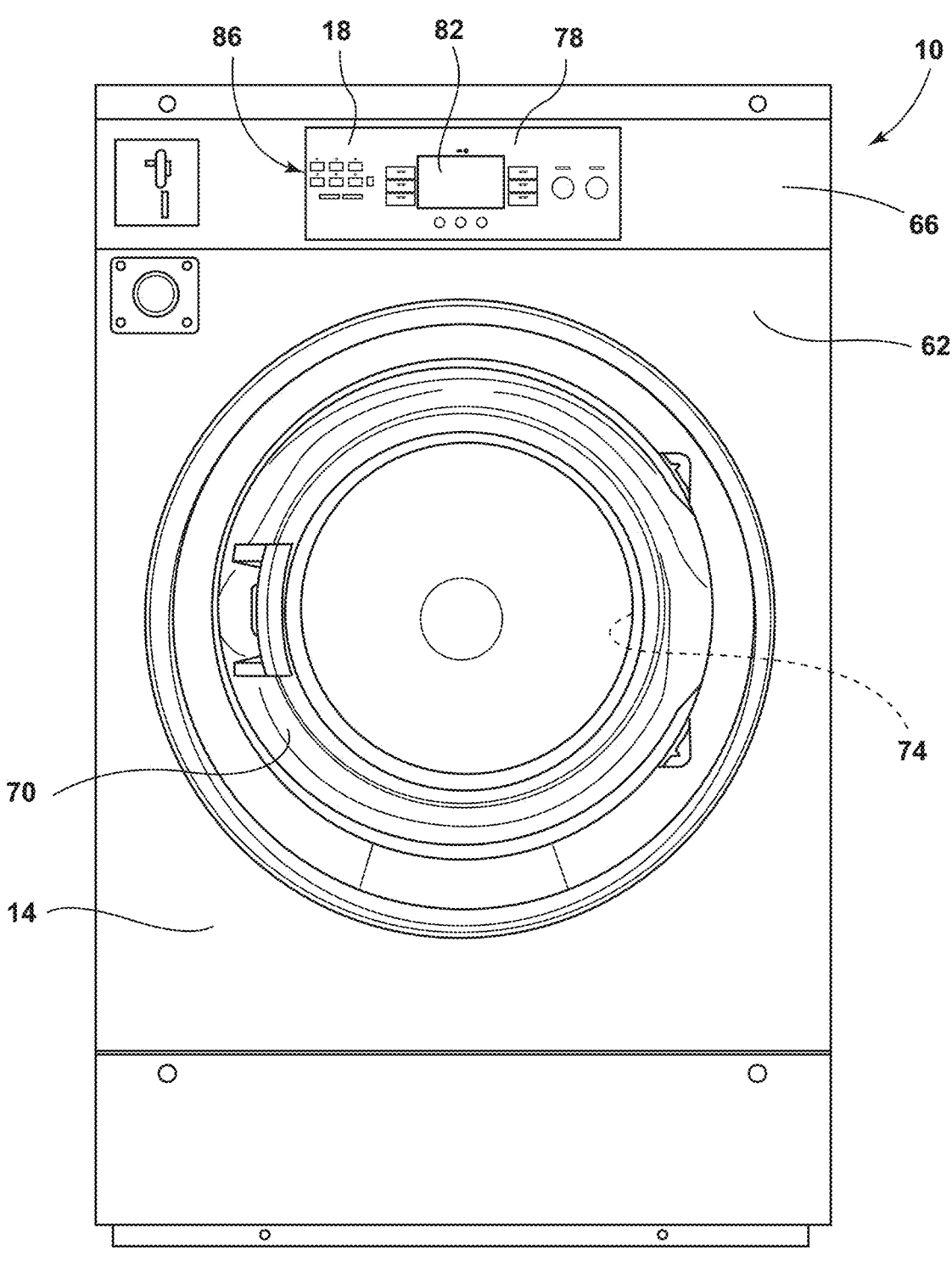
FIG. 1 is a front elevational view of an appliance of the present disclosure.

The components in the figures are not necessarily to scale, emphasis instead being placed upon illustrating the prin-ciples described herein.

DETAILED DESCRIPTION

The present illustrated embodiments reside primarily in combinations of method steps and apparatus components related to facial recognition for an appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizon-tal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alter-native orientations, except where expressly specified to the contrary. It is also to be understood that the specific devices and processes illustrated in the attached drawings, and described in the following specification are simply exem-plary embodiments of the inventive concepts defined in the appended claims. Hence, specific dimensions and other physical characteristics relating to the embodiments dis-closed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-7, reference numeral 10 generally designates an appliance that includes a body 14 and an interface panel 18 coupled to the body 14. A scanning device 22 is coupled to the interface panel 18 and is configured to conduct a facial scan for gathering a facial data set 26. A controller 30 is operably coupled to the scanning device 22 and is configured to receive the facial data set 26. A memory storage 34 is operably coupled to the controller 30. The memory storage 34 includes a profile database 38 that includes a stored verification data set 42. The controller 30 is configured to use the facial data set 26 from the scanning device 22 to compare the facial data set 26 and the stored verification data set 42. The controller 30 is further configured to activate a routine 46 based on a respective profile 50 from the profile database 38 when the facial data set 26 matches the stored verification data set 42.

Figure 2:
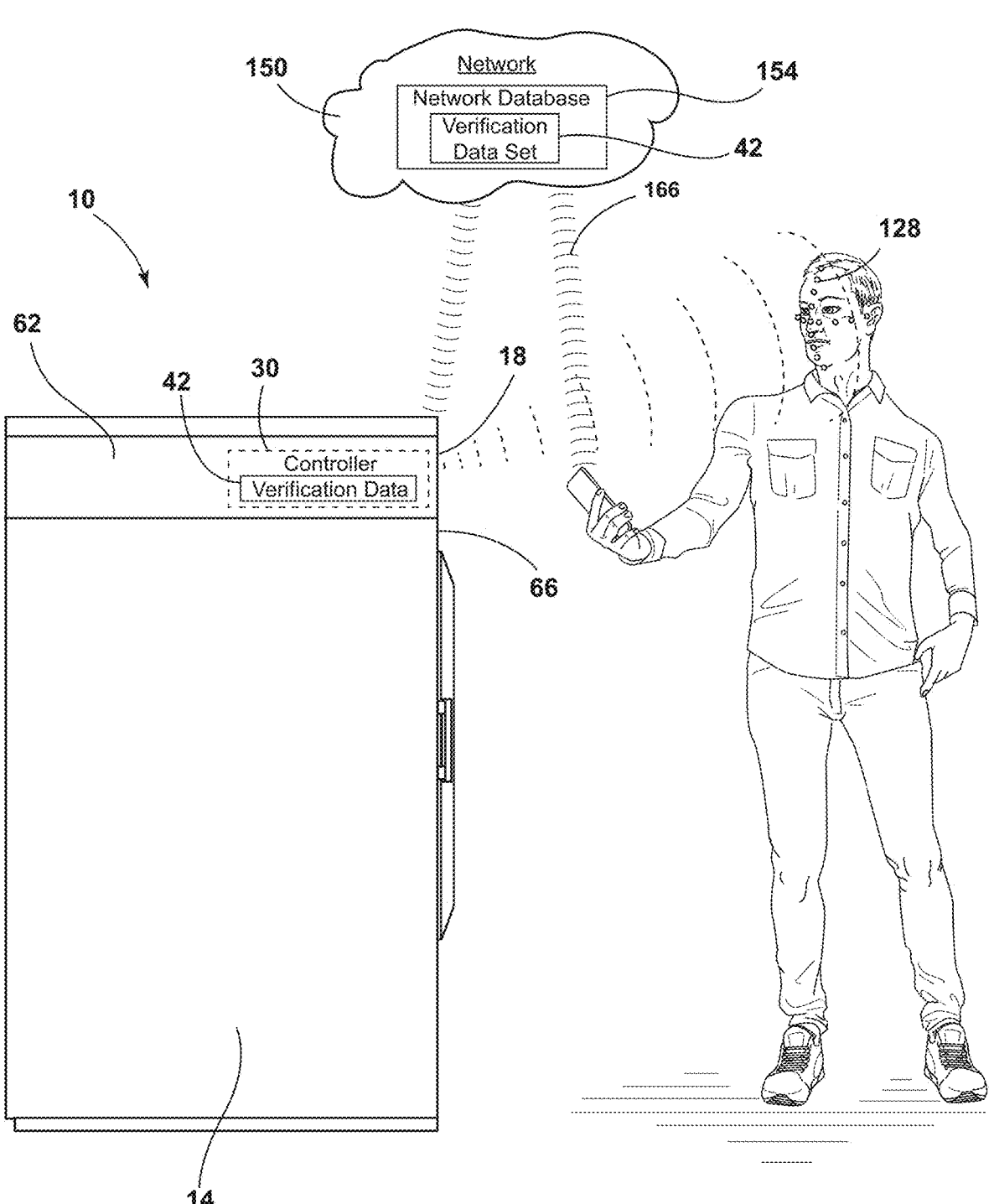
FIG. 2 is a side elevational view of an appliance conduct-ing a facial scan of a user of the present disclosure.

Referring to FIGS. 1 and 2, the appliance 10, that can incorporate the scanning device 22 and the interface panel 18, includes a cabinet 62 having a front surface 66 and a door 70 rotatably coupled to the cabinet 62. The door 70 may be a flat panel door, a fishbowl-style door, or a combination thereof. As illustrated in FIG. 1, the appliance 10 is a front-load, horizontal axis appliance. However, the appliance 10 may be a washer, dryer, and/or a combination thereof. Further, the appliance 10 may be a top-load appliance or a front-load appliance. It is further contemplated that the appliance 10 is a commercial appliance such as a commercial laundry appliance that is operated according to a payment system. Additionally, the door 70 is operable between opened and closed positions. The door 70, as illustrated in FIG. 1, opens in a side-to-side manner, however, it is contemplated that the door 70 may open in an up-and-down manner. The door 70 is configured to allow access to a drum 74 positioned within the cabinet 62 when in the opened position and encloses the drum 74 when in the closed position.

Figure 3:
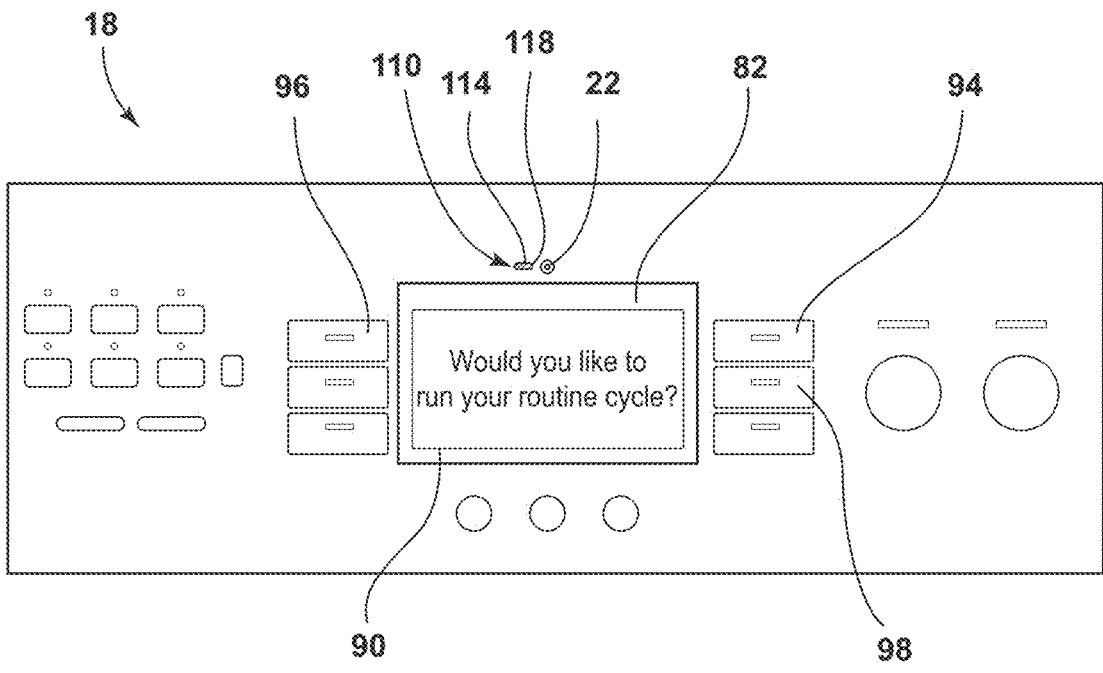
FIG. 3 is a front elevational view of an interface panel for the appliance of FIG. 1.
Figure 4:
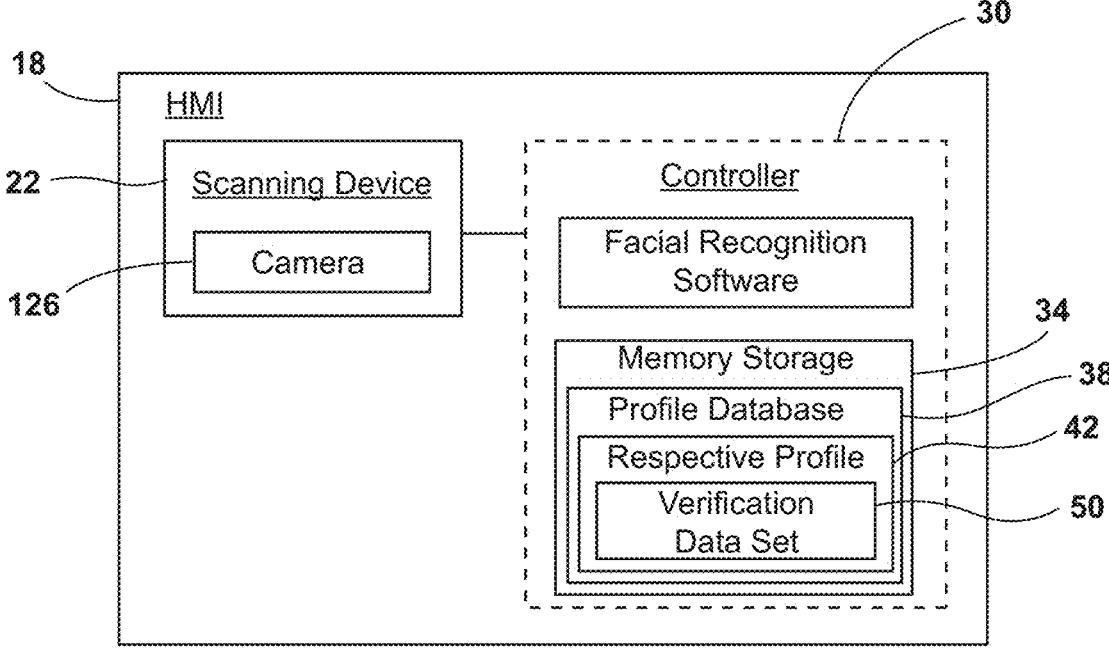
FIG. 4 is a schematic block diagram of an interface panel that includes a scanning device and a controller of the present disclosure.
Figure 5:
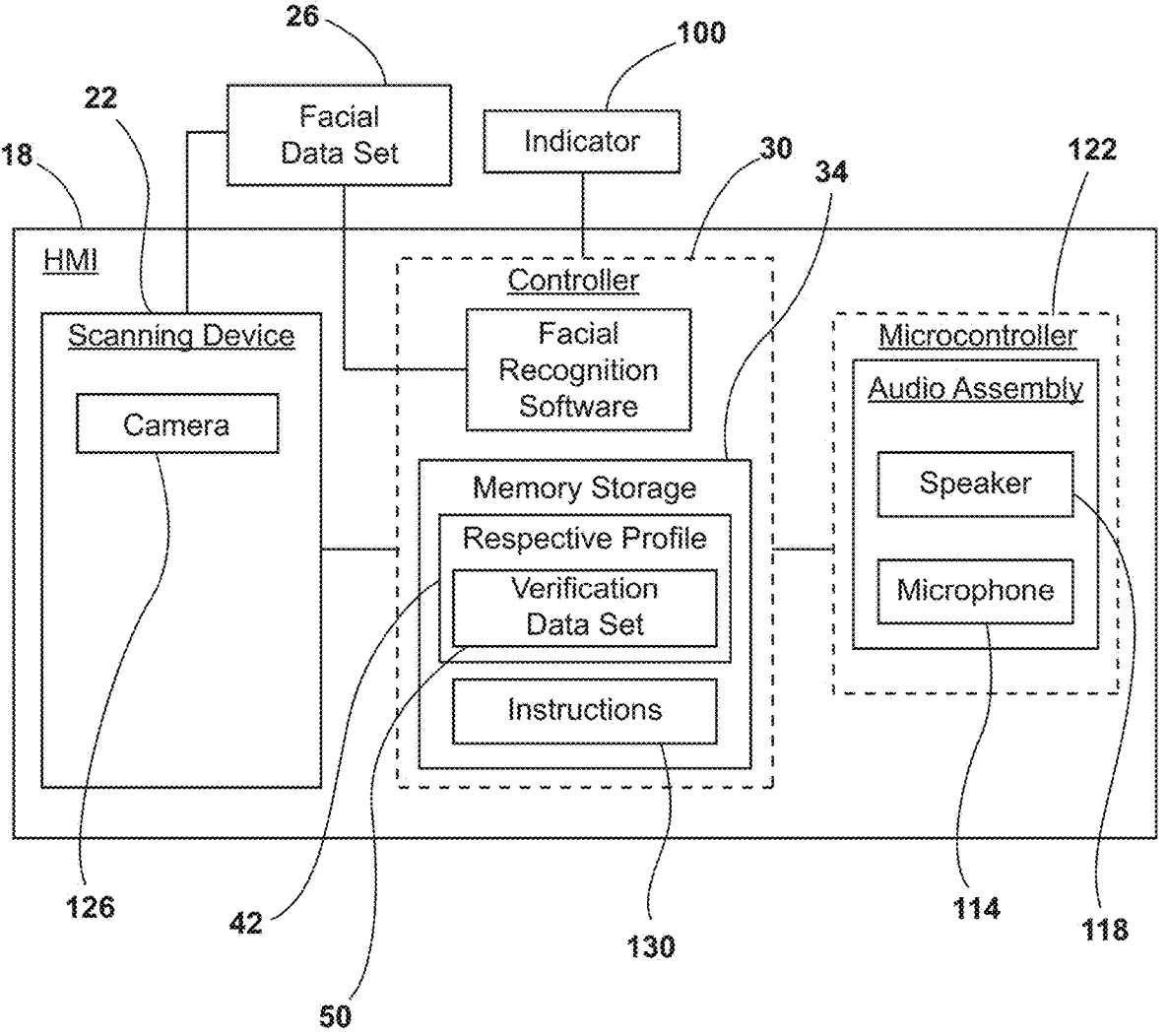
FIG. 5 is a schematic block diagram of an interface panel that includes a scanning device, a controller, and a controller of the present disclosure.
Figure 6:
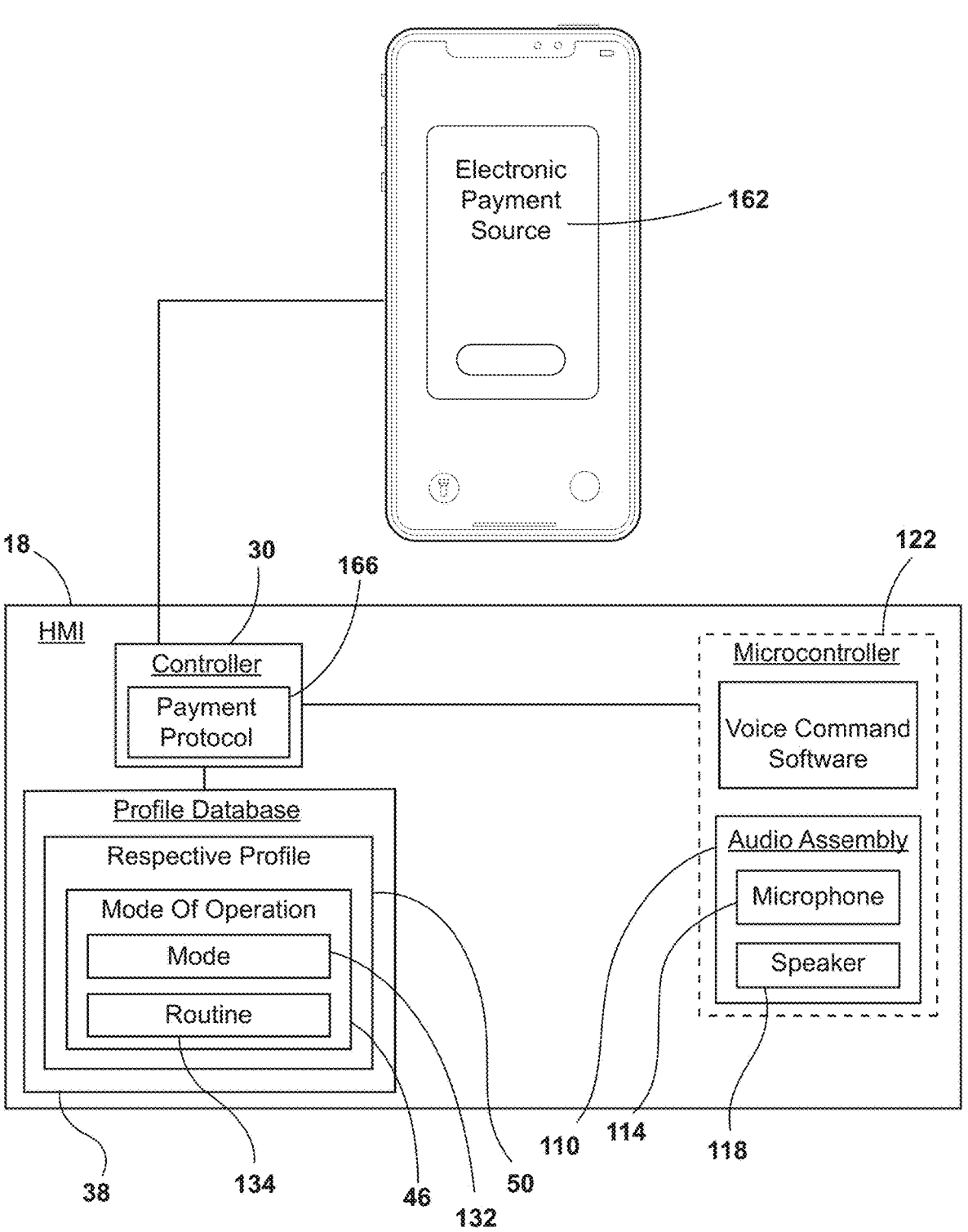
FIG. 6 is a schematic block diagram of a controller of an interface panel in communication with a controller and a respective profile of the present disclosure.
Figure 7:
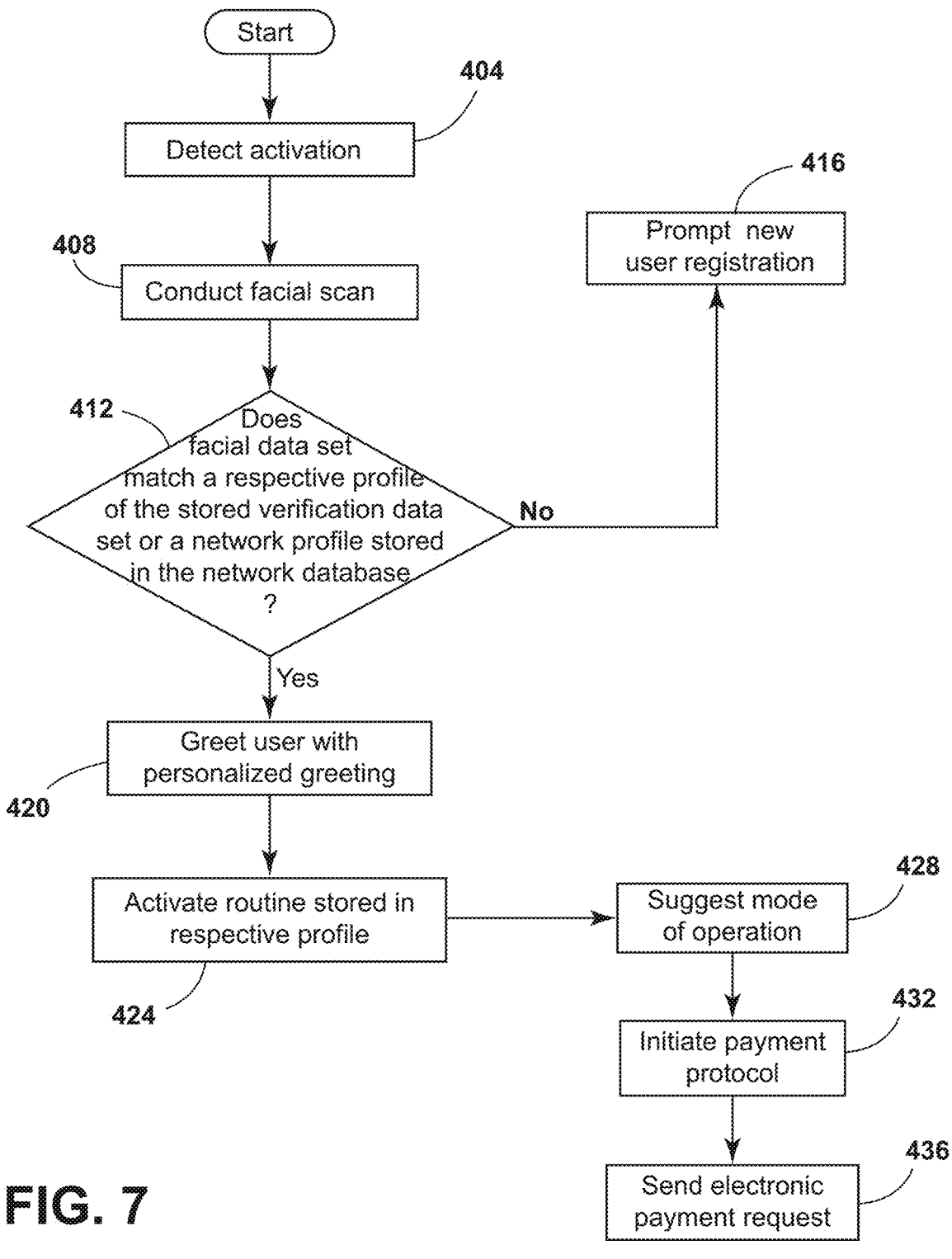
FIG. 7 is a schematic flow diagram for a method of operating an appliance using facial recognition.
Figure 8:
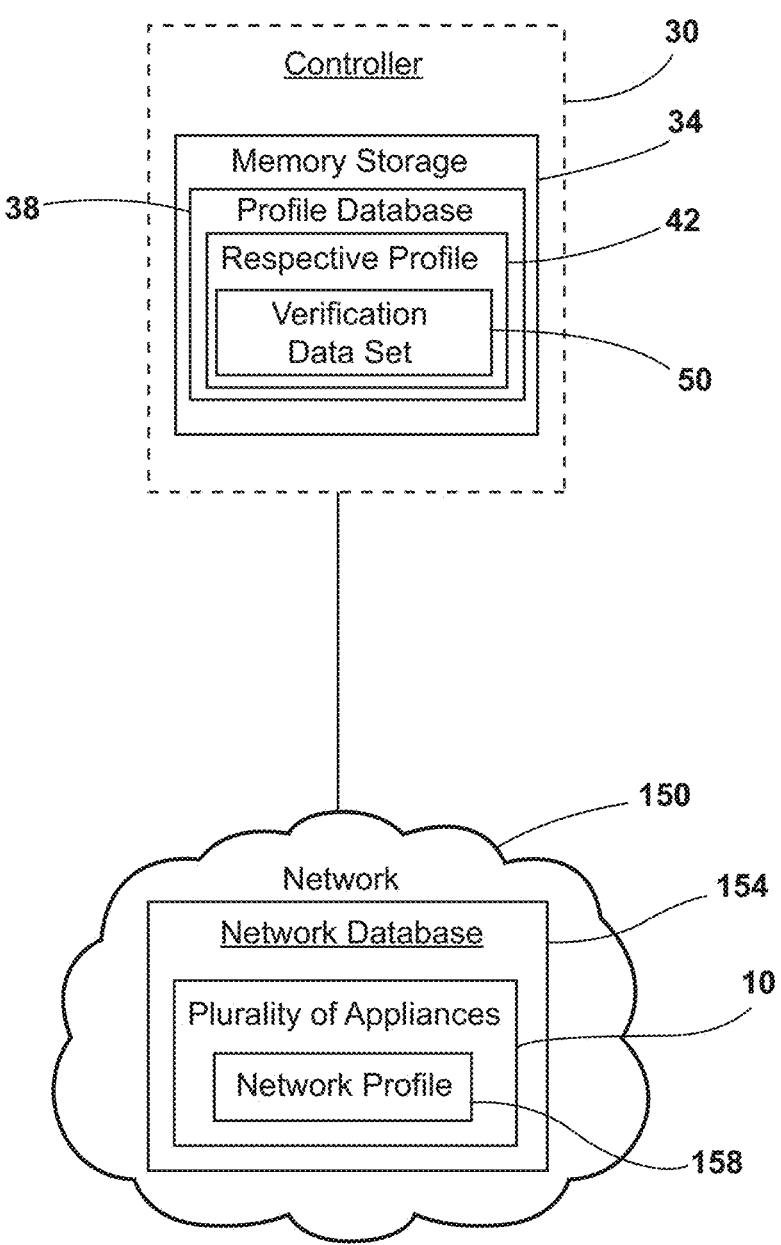
FIG. 8 is a flow diagram for a method of operating an appliance using facial recognition and a network.

Referring still to FIGS. 1-3, the front surface 66 of the cabinet 62 may include the interface panel 18, which is described throughout as a human-machine interface (HMI). As illustrated, the HMI 18 is positioned on an upper edge portion 78 of the front surface 66 of the cabinet 62. However, it is contemplated that the HMI 18 may be positioned elsewhere on the cabinet 62 of the laundry appliance 10, without departing from the teachings herein. The HMI 18 includes a display screen 82 and a plurality of buttons 86. The display screen 82 may be configured to display various messages 90 to a user. For example, the messages 90 may relate to the verification of the facial data set 26 as compared to the stored verification data set 42. Additionally or alternatively, the messages 90 may relate to the status of the appliance 10 including levels of detergent or other chemistry or a status of a wash or dry cycle.

The HMI 18 may be further configured as a touch panel, such that a user may touch the display screen 82. Alternatively, the user may select a button of the plurality of buttons 86 to choose a particular function. The plurality of buttons 86 may include, but are not limited to, an HMI power button 94, a home button 96, and a settings button 98. The HMI power button 94 is configured to activate and deactivate the HMI 18. The HMI 18 may be activated by the user touching the HMI 18, which sends an indicator 100 to the controller 30 that corresponds with the system being in use. Optionally, the HMI 18 may include a proximity sensor, which may activate by a user approaching the HMI 18 and the controller 30 when a user is detected in the range of the proximity sensor. Additionally or alternatively, the user's presence may be detected by the user activating the HMI 18, either by touching the display screen 82 or by activating one of the plurality of buttons 86, such that the controller 30 turns on the HMI 18 and activates the scanning device 22.

Referring to FIGS. 1-7, the HMI 18 may include an audio assembly 110 that has a microphone 114 and a speaker 118. It is generally contemplated that the appliance 10 may include a microcontroller 122 configured to control the audio assembly 110 and to communicate with the controller 30. Accordingly, the microcontroller 122 may include voice command software. It is optionally contemplated that the controller 30 is configured to directly control the audio assembly 110. For purposes of this disclosure, the microcontroller 122 is described as controlling the audio assembly 110 in combination with the controller 30. The microcontroller 122 sends a signal to the speaker 118 in response to a user's presence at the appliance 10.

The scanning device 22 includes a camera 126 or other vision-based device configured to conduct the facial scan of the user. The scanning device 22 collects a set of data points 128 on a user's face and sends signals to the controller 30 to define the facial data set 26 of the respective profile 50 for that user. It is contemplated that the controller 30 includes facial recognition software. The respective profile 50 includes the data points 128 used to develop the facial data set 26 collected for future comparison. Accordingly, the respective profile 50 is stored within the profile database 38 of the memory storage 34 as a part of the stored verification data set 42. In collecting the facial data set 26, the scanning device 22 may select the data points 128 according to various facial dimensions, features, characteristics, or other identifying data points 128. By way of example, not limitation, the scanning device 22 may use the facial scan to identify at least two data points 128 between a user's eyes, nose, forehead, chin, mouth, etc. to develop a unique facial data set 26. Accordingly, each time that the user accesses the appliance 10, the scanning device 22 will conduct a facial scan of the user, gathering a temporary facial data set 26 to be compared with the stored verification data set 42.

The facial data set 26 may be either temporary or initial. An initial facial data set 26 is used to create the respective profile 50 for each user. As mentioned above, the scanning device 22 is used to collect the various facial data points 128, which are then used to create the facial data set 26. The initial facial data set 26 is stored in the memory storage 34 and saved as the stored verification data set 42 of a respective profile 50 in the profile database 38. The temporary facial data set 26 is used to compare with the stored verification data set 42 to identify the respective profile 50 of the user. This information comparison is completed by the facial recognition software of the controller 30 to compare and identify the facial data set 26 relative to the respective profile 50 stored in the profile database 38.

The memory storage 34 may be an onboard memory storage 34 that includes a plurality of stored verification data sets 42 in the profile database 38. The onboard memory storage 34 may be integrated directly with the HMI 18, such that the HMI 18 and the appliance 10 retain the profile database 38. Optionally, the memory storage 34 may be incorporated in the controller 30. In such a configuration, the memory storage 34 is built into the controller 30, such that the profile database 38, and thus the stored verification data sets 42, are integrated with the controller 30. In this configuration, the controller 30 contains the stored verification data set 42 for comparison with the facial data set 26 obtained by the facial scan. Accordingly, where the controller 30 includes the memory storage 34, the controller 30 communicates directly with the scanning device 22, or indirectly via the microcontroller 122, to conduct the matching between the facial data set 26 obtained by the scanning device 22 and a stored verification data set 42 stored in the profile database 38.

The profile database 38 is stored within the memory storage 34 and is accessed by the controller 30 for comparison purposes. The profile database 38 stores the plurality of stored verification data sets 42. Each stored verification data set 42 of the plurality of stored verification data sets 42 corresponds to a respective profile 50. Thus, each respective profile 50 is stored within the profile database 38, which is in direct, or indirect, communication with the controller 30 to, ultimately, access the respective profile 50 of the user. The controller 30 communicates with the profile database 38 to compare the gathered, temporary facial data set 26 with the stored verification data set 42 of the respective profile 50. Each stored verification data set 42 is stored within the respective profile 50 of the user within the profile database 38; thus, to identify a matching stored verification data set 42, the controller 30 runs a comparison across the profile database 38 of each respective profile.

The controller 30 may include a processor, other control circuitry, and a memory. The controller 30 may also include various instructions 130. It is also contemplated that the controller 30 may include the microcontroller 122, such that the controller 30 may perform the same functions as the microcontroller 122 as described herein. By way of example, and not limitation, at least one instruction 130 may correspond to facial recognition and granting privileges, such as access to the respective profile 50 of the user, in response to the facial recognition of the user. Additionally or alternatively, at least one instruction 130 may correspond to selecting and implementing a routine 46 or mode 132 of a mode of operation 134 in response to the granting of privileges. Further, the controller 30 may be configured as a "Raspberry Pi®" or other configurations of single-board computers. The controller 30, using the facial recognition software, is configured to compare the facial data set 26 collected or generated by the facial scan with the stored verification data set 42 to verify the attempted user. The controller 30 is in further communication with the microcontroller 122 for the audio assembly 110.

Referring still to FIGS. 1-6, once the facial data set 26 is verified by the controller 30 as compared to the stored verification data set 42, the respective profile 50 is confirmed as a match and is made accessible to the user. The user may then use a voice command to select the mode 132 of the mode of operation 134 for the appliance 10. The mode of operation 134 may include the routine 46 accessed regularly by the user. The routine 46 may be a regularly used cycle, which may correspond to the selection of the mode of operation 134. The user may either select the routine 46 presented by the controller 30 based on the respective profile 50 or, optionally, the user may select a different mode 132 of the modes of operation 134 that may or may not correspond to the presented routine 46.

Each respective profile 50 contains a set of modes of operation 134, which may correspond to various modes 132 that may be prompted by the controller 30 and/or selected by the user. One of the modes 132 of the mode of operation 134 is the routine 46. The routine 46 may correspond to a favorite or frequently used laundry cycle, such that the controller 30, upon matching the respective profile 50, may prompt the routine 46. The user may make an alternate selection for the mode of operation 134, which may correspond with actions such as starting a cycle, selecting a type of cycle, selecting a temperature of water, selecting a length of the cycle, and other operational selections typically used with laundry appliances. The appliance 10 may include the speaker 118 proximate and communicatively coupled to the microphone 114. When the voice command is received by the microphone 114, the microphone 114 sends the voice command to the microcontroller 122. The microcontroller 122 may then process the voice command and provide audible feedback to the user via the speaker 118.

Optionally, once the respective profile 50 is selected, the controller 30 may emit a response to the user acknowledging the match between the facial data set 26 and the stored verification data set 42. This acknowledgment may be performed by a personalized greeting, such as using the user's name to greet the user. Additionally or alternatively, if the user has not yet registered a facial data set 26, the microcontroller 122 may still send a signal to the speaker 118 to issue a generic greeting to the user, such as "Good morning" or "Good evening." The controller 30 determines via comparison whether the user has a respective profile 50 in the stored verification data set 42 and communicates that determination with the microcontroller 122. Based on this information from the controller 30, the microcontroller 122 determines which greeting, personalized or generic, is proper and sends the corresponding signal to the speaker 118.

Referring to FIGS. 2-6, a user may activate the HMI 18 by touching the display screen 82, the home button 96, the power button 94, or, where the HMI 18 includes the proximity sensor, by approaching the appliance 10 (FIG. 1). The controller 30 will send a signal to the scanning device 22 to conduct the facial scan of the user. The controller 30 will then receive the facial data set 26 from the scanning device 22. Where the memory storage 34 is an onboard memory storage 34, the controller 30 will communicate with the onboard memory storage 34 to compare the facial data set 26 with the stored verification data sets 42. When conducting this comparison, the controller 30 compares the stored verification data sets 42 with the facial data set 26 to identify a matching respective profile 50 within the stored verification data set 42 that corresponds with the facial data set 26.

If the controller 30 identifies a matching respective profile 50 to the facial data set 26, the controller 30 will send a signal to the microcontroller 122 containing the user's personal information (i.e., name). The microcontroller 122 will then send a personalized message 90 from the speaker 118. If the controller 30 does not find a matching respective profile 50 within the stored verification data set 42, then the controller 30 will send a signal to the microcontroller 122 to send a generic communication from the speaker 118. Furthermore, if the facial data set 26 does not correspond to a respective profile 50 in the profile database 38, then the controller 30 may send a signal to the HMI 18 to display a message 90, prompting the user to register as a new user.

Referring still to FIGS. 1-6, if the facial scan of the user is not verified by the controller 30, the controller 30 may communicate with the HMI 18 to either provide an optional password override or prompt a new registration. The HMI 18 will then prompt the user to use the scanning device 22 to create a facial data set 26 to be stored in the profile database 38 for future use as the user's respective profile 50 in the stored verification data set 42. In order for the user to complete the new registration, the HMI 18 will display a message 90 prompting the user to choose the new registration selection on the display screen 82. Once selected, the scanning device 22 will conduct a facial scan to create a new facial data set 26 for the new user. The new facial data set 26 may then be stored in the profile database 38 of the memory storage 34 as the stored verification data set 42 for the respective profile 50 for the new user. In making the selections during the new registration, the user may use voice commands directed to the microphone 114, which then communicates the voice commands to the microcontroller 122. By way of example, not limitation, the user may use the voice commands to set up the respective profile 50 with the user's name, settings, cycle preferences, and payment options.

Additionally or alternatively, the new user may use a portable computing device in communication with the controller 30 over a network 150 to convey the user's information, including the new facial data set 26, to the controller 30. Thus, it is contemplated that the new user may use a separate facial scanning device 22 and later communicate the new facial data set 26 with the controller 30 of the appliance 10 (FIG. 1). The controller 30 may download the information from the network 150 and store the information gathered in the memory storage 34, discussed in further detail below.

If a respective profile 50 is identified by the controller 30, then the controller 30 will prompt a mode of operation 134, which may be a routine 46, based on the respective profile 50. Thus, the controller 30 may activate a routine 46 for the user based on the respective profile 50. The activation of the routine 46 is defined by the presentation of the routine 46 to the user, typically, as a message 90 on the HMI 18 display screen 82. As mentioned above, the routine 46 may include an action that the user of the respective profile 50 frequently uses, such as, by way of example, not limitation, a wash cycle for whites using hot water and a cool rinse cycle. Additionally or alternatively, the controller 30 may prompt modes of operation 134 that may correspond to a general setting, such as a general wash cycle, and the user may select specific modes 132 of the modes of operation 134. Such mode 132 selection may either define a new cycle selection within the modes of operation 134 or it may correspond with the user establishing the user's routine 46 for future use. It is also contemplated that the routine 46 may be established through repeated use and selection of the same modes 132 for a cycle.

The user may select the modes of operation 134 by touching the HMI 18 display screen 82 where prompted by the controller 30. Optionally, the user may instead give voice commands to make selections with regard to the modes of operation 134. In such an instance, the user will direct the voice command to the microphone 114 and the voice command will be received by the microcontroller 122. The microcontroller 122 will share the voice command signal with the controller 30, which will then select a mode 132 of the mode of operation 134 that corresponds to the mode 132 indicated by the voice command.

Referring to FIGS. 1, 2, and 5-9, the controller 30 may be in communication with a network database 154 over the network 150, which communicatively couples a plurality of appliances 10. Accordingly, a user may have a network profile 158, rather than the respective profile 50, that is stored in the network database 154 and includes the stored verification data set 42 that is used to verify the facial data set 26 received by the controller 30. In such configuration, a separate memory storage 34 is retained in the network database 154. Thus, a user may use any one of the plurality of appliances 10 and the controller 30 can access the user's network profile 158 regardless of the appliance 10 used, so long as the appliance 10 is in communication with the network database 154. Stated differently, the memory storage 34 of the network 150 is independent of the appliance 10. This is advantageous as it allows a user to access their network profile 158 in a variety of locations without being bound by a single appliance 10 or appliance location. By way of example, and not limitation, the user may access their network profile 158 at an appliance location corresponding to an individual laundromat that is a part of a chain of laundromats that use the appliance 10 described herein in communication with the network database 154.

It is also contemplated that the appliance 10 may still have the onboard memory storage 34 while the controller 30 is in communication with the network database 154. The user's network profile 158 may optionally be downloaded by the controller 30 and stored in the onboard memory storage 34. Thus, a user may save their network profile 158 as a respective profile 50 in the profile database 38 stored in the onboard memory storage 34. This allows a user to establish a respective profile 50 with a frequently used appliance 10 without continual downloading of a network from profile 158 from the network 150.

In this construction, the scanning device 22 conducts the facial scan and sends the facial data set 26 to the controller 30. The controller 30 will then compare the facial data set 26 to the stored verification data set 42 in the onboard memory storage 34. If there is a match between the facial data set 26 and the stored verification data set 42, then the controller 30 will proceed as described above by activation of a routine 46. However, if the controller 30 does not confirm the facial data set 26 with a stored verification data set 42, then the controller 30 will compare the facial data set 26 with the network database 154. As the network database 154 includes the network profiles 158, the controller 30 will compare the facial data set 26 to the network profiles 158 to determine if there is a matching network profile 158. Thus, a user may use an appliance 10 on which the user has not previously stored a verification data set 42. Once the network profile 158 is identified, the controller 30 will proceed as described above (i.e., suggesting a routine 46, or mode of operation 134, based on either the respective profile 50 or the network profile 158). The network profile 158 may also be downloaded as a profile 50 of the on-board memory 34.

Referring to FIGS. 1-9, once the user's respective profile 50 is identified and the user selects a mode of operation 134, the controller 30 will send a payment request to an electronic payment source 162 in order to complete a payment protocol 166. The electronic payment source 162 may include, but is not limited to, an electronic wallet configured as a part of a banking application or other payment application typically used and incorporated with a user's portable computing device. It is generally contemplated that the user may set up the respective profile 50 to include routing and account information for the user's bank, such that the electronic payment source 162 that receives the payment request from the controller 30 is the user's bank account directly. A similar process is accomplished where the controller 30 identifies a user's network profile 158 rather than a user's respective profile 50. It is contemplated that the network profile 158 will contain similar banking, electronic wallet, or other payment application information that is communicatively coupled to the controller 30. Thus, regardless of whether the user has used the specific appliance 10 prior to the interaction, the controller 30 will be able to send the payment request to the electronic payment source 162.

The method 300 for operating the appliance 10 described herein includes the following steps. The scanning device 22 conducts a facial scan (step 302) and obtains a facial data set 26 from the facial scan (step 304). The facial data set 26 is then transferred to the controller 30 (step 306). The controller 30 matches the facial data set 26 with a respective profile 50 within a profile database 38 (step 310). Specifically, the controller 30 compares the facial data set 26 with a stored verification data set 42 within the profile database 38 (step 314). Where the controller 30 does not identify a respective profile 50 that matches the facial data set 26, the controller 30 may communicate with the network database 154 to identify a network profile 158 (step 318). Additionally or alternatively, where the controller 30 does not identify either a respective profile 50 of the stored verification data set 42 or a network profile 158, then the facial data set 26 obtained by the facial scan may be saved as a new respective profile 50 in the profile database 38 (step 322). Once the respective profile 50, or network profile 158, is identified, the controller 30 may present a routine 46 based on the respective profile 50 (step 326). The presentation of the routine 46 may include suggesting a mode of operation 134 based on an activity history stored in the respective profile 50 or the network profile 158 (step 330). The user may then select a mode of operation 134 from the routine 46 presented by the controller 30 (step 334). After the user selects the mode of operation 134, the controller 30 will perform a payment protocol 166 (step 338). In completing the payment protocol 166, the controller 30 will send a payment request to an electronic payment source 162 (step 342).

The method 400 of operating the appliance 10 may be completed by the HMI 18 detecting activation of the appliance 10 (step 404). This activation may occur by the user approaching the appliance 10, touching the HMI 18 display screen 82, touching one of the plurality of buttons 86, or other actions known to activate the appliance 10. Once the appliance 10 is activated, the scanning device 22 will conduct the facial scan of the user to gather a facial data set 26 (step 408). The controller 30 will then determine whether the facial data set 26 gathered by the scanning device 22 matches a stored verification data set 42 of either a respective profile 50 of the profile database 38 or a network profile 158 of the network database 154 (decision step 412). If the facial data set 26 does not match a stored verification data set 42, then the controller 30 may prompt the new user registration (step 416). Alternatively, if the facial data set 26 does not match a stored verification data set 42, the HMI 18 may include an option to use a password to override the facial recognition software of the controller 30 to access the user's respective profile 50.

If the controller 30 matches the facial data set 26 to a stored verification data set 42 of a respective profile 50, then the controller 30 may greet the user with a personalized greeting (step 420). The controller 30 may then prompt the user to make a selection either of a routine 46 or a mode of operation 134, which the controller 30 will then activate (step 424). Upon activation, the controller 30 may prompt additional mode 132 suggestions to further personalize the cycle (step 428). Once the user makes a selection, the controller 30 will initiate a payment protocol 166 (step 432). In initiating the payment protocol 166 the controller 30 will access the payment information stored in the user's respective profile 50 to send a payment request to an electronic payment source 162 (step 436).

The invention disclosed herein is further summarized in the following paragraphs and is further characterized by combinations of any and all of the various aspects described therein.

According to one aspect of the present disclosure, an appliance comprises a body, an interface panel, a scanning device, a controller, and a memory storage. The interface panel is coupled to the body. The scanning device is coupled to the interface panel and is configured to conduct a facial scan for gathering a facial data set. The controller is operably coupled to the scanning device, wherein the controller is configured to receive the facial data set. The memory storage is operably coupled to the controller, wherein the memory storage includes a profile database that includes a stored verification data set. The controller is configured to use the facial data set from the scanning device to compare the facial data set and the stored verification data set. The controller is further configured to activate a routine based on a respective profile from the profile database when the facial data set matches the stored verification data set.

According to another aspect, a controller is communicatively coupled to a network database. The network database is in communication with a plurality of appliances.

According to another aspect, a memory storage is an onboard memory storage. The onboard memory storage is configured to store a plurality of stored verification data sets that correspond to respective user profiles.

According to another aspect, an interface panel includes a microphone that is configured to receive a voice command after a controller matches a facial data set with a verification data set.

According to another aspect, a microphone is communicatively coupled to a microcontroller. The microcontroller is configured to send a signal in response to a voice command.

According to another aspect, a controller is configured to communicate with a microcontroller to select a mode of operation in response to a voice command. The mode of operation is selected from a routine activity by the controller based on a respective profile from a profile database.

According to another aspect, a controller is communicatively coupled to an electronic payment source. The controller is configured to request payment from the electronic payment source after matching of a facial data set with a verification data set in response to a selected mode of operation.

According to yet another aspect of the present disclosure, an appliance includes a body, an interface panel, a scanning device, and a controller. The interface panel is coupled to the body. The scanning device is coupled to the interface panel and is configured to conduct a facial scan and gather a facial data set. The controller is communicatively coupled to the scanning device, wherein the controller is configured to receive the facial data set and compare the facial data set to a stored verification data set. The controller is configured to activate a routine based on the comparison of the facial data set and the stored verification data set.

According to another aspect, a memory storage is communicatively coupled to a controller. The memory storage includes a profile database that maintains a stored verification data set and is configured to maintain a plurality of verification data sets that correspond to user profiles in a profile database.

According to another aspect, a controller is configured to use a facial data set from a scanning device to activate a routine based on a respective profile of a user profile from a profile database after matching of the facial data set with a stored verification data set.

According to another aspect, an interface panel includes a microphone that is communicatively coupled to a controller. The microphone is configured to receive a voice command after a controller matches a facial data set with a verification data set.

According to another aspect, a controller is configured to select a mode of operation in response to a voice command received by a controller from a microphone. The mode of operation is selected from a routine activated by the controller based on a profile from a profile database.

According to another aspect, a controller is communicatively coupled to a network database. The network database is in communication with a plurality of appliances, wherein each appliance includes an onboard memory storage.

According to another aspect, a controller is communicatively coupled to an electronic payment source. The controller is configured to request payment from the electronic payment source in response to a selected mode of operation.

According to yet another aspect of the present disclosure, a method of operating an appliance includes conducting a facial scan with a scanning device, obtaining a facial data set from the facial scan, transferring the facial data set to a controller, matching the facial data set with a respective profile within a profile database, and presenting a routine based on the respective profile.

According to another aspect, a step of presenting a routine includes suggesting a mode of operation based on an activity history in a respective profile.

According to another aspect, a step of matching a facial data set with a controller includes communicating with a network database, wherein the network database is in communication with a plurality of appliances.

According to another aspect, a step of conducting a facial scan with a scanning device includes saving a new facial data set to a profile database. The step of saving the new facial data set includes creating a new respective profile of the profile database.

According to another aspect, a step of matching a facial data set includes the step of comparing the facial data set with a stored verification data set stored within a profile database.

According to another aspect, the method further comprises steps of selecting a mode of operation from a routine presented, and performing a payment protocol, wherein the payment protocol includes a step of sending a payment request to an electronic payment source.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A commercial laundry system, comprising:
multiple laundry appliances each configured to perform laundry cycles, wherein each laundry appliance includes:
a body defining an opening for receiving laundry items for the laundry cycles;
a scanning device coupled with the body, wherein the scanning device includes an imager for obtaining facial data points of a user; and
a controller communicatively coupled with the scanning device; and
a network database having user profiles stored in a memory storage, wherein each user profile includes a stored data set, and wherein the controllers are configured to:
receive the facial data points from a respective one of the scanning devices;
compare the facial data points of the user with the stored data sets in the user profiles;
determine if the facial data points match one of the stored data sets to identify a matching data set;
present a mode of operation for performing at least one of the laundry cycles for a respective one of the multiple laundry appliances based on the user profile for a matching stored data set;
send a payment request for a selected mode of operation; and
initiate the selected mode of operation to perform at least one of the laundry cycles.

2. The commercial laundry system of claim 1, wherein the controller is configured to:
initiate the selected mode of operation upon receipt of payment.

3. The commercial laundry system of claim 1, wherein the controller is configured to:

prompt registration to create a new user profile when the facial data points are free of the matching stored data set.

4. The commercial laundry system of claim 3, wherein the facial data points are stored in the network database as a new facial data set for the new user profile upon registration.

5. The commercial laundry system of claim 1, wherein the controller is configured to:

prompt use of a password override when the facial data points are free of the matching stored data set.

6. The commercial laundry system of claim 1, further comprising:

a microphone configured to receive voice commands, wherein the controller is configured to receive the voice commands for changing the mode of operation and selecting the selected mode of operation.

7. The commercial laundry system of claim 1, wherein the controller includes an onboard memory storing a profile database, and wherein the controller is configured to compare the facial data points with the profile database.

8. The commercial laundry system of claim 1, wherein each of the multiple laundry appliances includes:

a human-machine interface coupled with the body; and a proximity sensor coupled with the human-machine interface, wherein the human-machine interface is configured to be activated in response to a signal from the proximity sensor.

9. A laundry system, comprising:

multiple laundry appliances each configured to perform laundry cycles, wherein each laundry appliance includes:

a body defining an opening for receiving laundry items for the laundry cycles; and a controller;

at least one scanning device communicatively coupled with the controller and configured to obtain a set of data points for a user; and a database communicatively coupled with the controllers, wherein the database includes user profiles each including a stored data set, and wherein the controllers are configured to:

receive the set of data points from the at least one scanning device;

compare the set of data points of the user with the stored data sets in the user profiles;

determine if the set of data points matches one of the stored data sets to identify a matching data set or if the database is free of a matching stored data set for the set of data points;

present modes of operation for performing at least one of the laundry cycles for a respective one of the multiple laundry appliances based on the user profile for the matching stored data set;

prompt registration of a new user profile when the database is free of the matching data set for the set of data points; and initiate a selected one of the laundry cycles based on a user command.

10. The laundry system of claim 9, wherein the controllers are configured to:

receive a new data set from the at least one scanning device when the facial data set is free of the matching stored data set.

11. The laundry system of claim 9, wherein the at least one scanning device includes multiple scanning devices, and wherein each laundry appliance includes one of the multiple scanning devices coupled to the respective body.

12. The laundry system of claim 9, wherein the at least one scanning device is included in a portable electronic device.

13. The laundry system of claim 9, wherein each laundry appliance includes at least one of a human-machine interface and a microphone for receiving the user command.

14. The laundry system of claim 9, wherein the controller is configured to:

send a payment request for the selected one of the laundry cycles; and initiate the selected one of the laundry cycles after receipt of payment in response to the payment request.

15. The laundry system of claim 9, wherein the database is a network database separate from the multiple laundry appliances.

16. A laundry system, comprising:

at least one laundry appliance configured to perform laundry cycles, wherein the at least one laundry appliance includes:

a body defining an opening for receiving laundry items for the laundry cycles; and a controller;

at least one scanning device communicatively coupled with the controller and configured to obtain a set of data points for a user; and a database communicatively coupled with the controller, wherein the database includes user profiles including stored data sets, and wherein the controller is configured to:

receive the set of data points from the at least one scanning device;

match the set of data points with the stored data set in one of the user profiles to identify a matching profile;

present modes of operation for performing at least one of the laundry cycles based on the matching profile; and initiate a selected mode of operation based on a user command.

17. The laundry system of claim 16, wherein the database is a network database separate from the at least one laundry appliance.

18. The laundry system of claim 16, wherein the at least one laundry appliance includes multiple laundry appliances.

19. The laundry system of claim 16, wherein the database is stored in an onboard memory of the controller.

20. The laundry system of claim 16, wherein the controller is configured to:

send a payment request for the selected mode of operation.

* * * * *